US008296643B1

(12) United States Patent
Vasilik

(10) Patent No.: US 8,296,643 B1
(45) Date of Patent: Oct. 23, 2012

(54) RUNNING MULTIPLE WEB PAGE EXPERIMENTS ON A TEST PAGE

(75) Inventor: Kenneth Eric Vasilik, Bellevue, WA (US)

(73) Assignee: Google Inc., Mountain View, CA (US)

( * ) Notice: Subject to any disclaimer, the term of this patent is extended or adjusted under 35 U.S.C. 154(b) by 1058 days.

(21) Appl. No.: 11/874,852

(22) Filed: Oct. 18, 2007

(51) Int. Cl.
*G06F 17/00* (2006.01)

(52) U.S. Cl. .......................................... 715/200; 715/205

(58) Field of Classification Search .................. 715/200, 715/255, 201, 202, 205
See application file for complete search history.

(56) References Cited

U.S. PATENT DOCUMENTS

| | | | | |
|---|---|---|---|---|
| 5,826,031 | A * | 10/1998 | Nielsen | 709/233 |
| 5,870,559 | A * | 2/1999 | Leshem et al. | 709/224 |
| 6,085,229 | A | 7/2000 | Newman et al. | |
| 6,173,316 | B1 | 1/2001 | De Boor et al. | |
| 6,405,222 | B1 * | 6/2002 | Kunzinger et al. | 715/205 |
| 6,405,223 | B1 * | 6/2002 | Kelley et al. | 715/205 |
| 6,605,120 | B1 | 8/2003 | Fields et al. | |
| 6,625,803 | B1 | 9/2003 | Massena et al. | |
| 6,721,922 | B1 | 4/2004 | Walters et al. | |
| 6,826,594 | B1 * | 11/2004 | Pettersen | 709/203 |
| 6,920,609 | B1 | 7/2005 | Manber et al. | |
| 6,934,748 | B1 | 8/2005 | Louviere et al. | |
| 7,028,001 | B1 | 4/2006 | Muthuswamy et al. | |
| 7,031,932 | B1 | 4/2006 | Lipsky et al. | |
| 7,039,599 | B2 | 5/2006 | Merriman et al. | |
| 7,047,294 | B2 | 5/2006 | Johnson et al. | |
| 7,047,318 | B1 * | 5/2006 | Svedloff | 709/246 |
| 7,168,040 | B2 | 1/2007 | Yamamoto et al. | |
| 7,194,683 | B2 | 3/2007 | Hind et al. | |
| 7,370,036 | B2 * | 5/2008 | Vedula | 707/770 |
| 7,523,087 | B1 | 4/2009 | Agarwal et al. | |
| 7,594,189 | B1 | 9/2009 | Walker et al. | |
| 7,747,602 | B2 * | 6/2010 | Sampson et al. | 707/708 |
| 7,895,293 | B1 * | 2/2011 | Vasilik | 709/218 |
| 7,895,514 | B1 | 2/2011 | Edmunds et al. | |
| 2001/0014895 | A1 | 8/2001 | Sappal | |
| 2002/0042738 | A1 | 4/2002 | Srinivasan et al. | |
| 2002/0069255 | A1 | 6/2002 | Dinovo | |
| 2002/0129064 | A1 | 9/2002 | Guthrie | |
| 2002/0143495 | A1 | 10/2002 | Roser | |
| 2002/0165940 | A1 * | 11/2002 | Kameoka et al. | 709/218 |
| 2002/0188508 | A1 | 12/2002 | Lee et al. | |
| 2003/0097374 | A1 * | 5/2003 | Himeno | 707/104.1 |
| 2003/0131106 | A1 | 7/2003 | Kasriel | |
| 2003/0163784 | A1 * | 8/2003 | Daniel et al. | 715/514 |
| 2004/0019634 | A1 * | 1/2004 | Van Geldern et al. | 709/203 |
| 2004/0107423 | A1 * | 6/2004 | Noda | 719/311 |

(Continued)

OTHER PUBLICATIONS

Freire et al., WebViews: Accessing Personalized Web Content and Services, ACM 2001, pp. 576-586.* Han et al., WebSplitter: A Unified XML Framework for Multi-Device Collaborative Web Browsing, ACM 2000, pp. 221-230.*
Song et al., Learning Block Importance Models for Web Pages, ACM 2004, pp. 203-211.*

(Continued)

*Primary Examiner* — Cong-Lac Huynh
(74) *Attorney, Agent, or Firm* — Fish & Richardson P.C.

(57) ABSTRACT

Methods, systems and apparatus, including computer program products, for performing multiple tests on a test web page. Source of a test web page is configured to perform multivariate testing by placing a number of variable content sections into the source of the test web page. Multiple tests having differing variable content for insertion into the variable content sections, or a subset thereof, can be performed without the need for the test page to be re-modified.

20 Claims, 10 Drawing Sheets

U.S. PATENT DOCUMENTS

| | | | |
|---|---|---|---|
| 2004/0123247 | A1 | 6/2004 | Wachen et al. |
| 2004/0168122 | A1 | 8/2004 | Kobipalayam Murugaiyan |
| 2005/0021397 | A1 | 1/2005 | Cui et al. |
| 2005/0034065 | A1 | 2/2005 | Weight |
| 2005/0071745 | A1* | 3/2005 | Ehrich et al. ............... 715/500.1 |
| 2005/0071755 | A1 | 3/2005 | Harrington et al. |
| 2005/0071757 | A1 | 3/2005 | Ehrich et al. |
| 2005/0160002 | A1 | 7/2005 | Roetter et al. |
| 2005/0268229 | A1* | 12/2005 | Wessling et al. ............. 715/528 |
| 2006/0031417 | A1* | 2/2006 | Narin ............................ 709/219 |
| 2006/0036400 | A1 | 2/2006 | Kasriel et al. |
| 2006/0085731 | A1* | 4/2006 | Cui et al. ................... 715/501.1 |
| 2006/0162071 | A1* | 7/2006 | Dixon et al. ..................... 5/93.1 |
| 2006/0173815 | A1* | 8/2006 | Vedula .............................. 707/3 |
| 2006/0184638 | A1* | 8/2006 | Chua et al. .................... 709/217 |
| 2006/0218490 | A1 | 9/2006 | Fink |
| 2006/0265400 | A1 | 11/2006 | Fain et al. |
| 2006/0271671 | A1 | 11/2006 | Hansen |
| 2006/0288328 | A1* | 12/2006 | Cross et al. ................... 717/114 |
| 2007/0027754 | A1 | 2/2007 | Collins et al. |
| 2007/0061700 | A1 | 3/2007 | Kothari et al. |
| 2007/0100956 | A1 | 5/2007 | Kumar |
| 2007/0124192 | A1* | 5/2007 | Moatti ........................... 705/10 |
| 2007/0124671 | A1 | 5/2007 | Hackworth et al. |
| 2007/0130510 | A1 | 6/2007 | Dharamshi et al. |
| 2007/0136255 | A1 | 6/2007 | Rizzo et al. |
| 2007/0143672 | A1 | 6/2007 | Lipton et al. |
| 2007/0150353 | A1 | 6/2007 | Krassner et al. |
| 2007/0214237 | A1* | 9/2007 | Stibel et al. ................... 709/217 |
| 2007/0271352 | A1 | 11/2007 | Khopkar et al. |
| 2007/0271392 | A1 | 11/2007 | Khopkar et al. |
| 2007/0271501 | A1 | 11/2007 | Vasilik |
| 2007/0271511 | A1 | 11/2007 | Khopkar et al. |
| 2007/0276813 | A1 | 11/2007 | Rosen |
| 2007/0299985 | A1 | 12/2007 | Craig et al. |
| 2008/0028334 | A1 | 1/2008 | De Mes |
| 2008/0046415 | A1 | 2/2008 | Henkin et al. |
| 2008/0046507 | A1* | 2/2008 | Westphal ...................... 709/203 |
| 2008/0092060 | A1* | 4/2008 | Berg et al. ..................... 715/748 |
| 2008/0133722 | A1* | 6/2008 | Ramasundaram et al. ... 709/222 |
| 2009/0006192 | A1 | 1/2009 | Martinez et al. |
| 2009/0030859 | A1* | 1/2009 | Buchs et al. .................... 706/19 |
| 2009/0113282 | A1* | 4/2009 | Schultz et al. ................ 715/208 |
| 2009/0150253 | A1 | 6/2009 | Williams et al. |
| 2009/0204579 | A1 | 8/2009 | Govani et al. |
| 2009/0241015 | A1* | 9/2009 | Bender et al. ................. 715/202 |
| 2009/0300483 | A1 | 12/2009 | Viet |
| 2010/0281389 | A1* | 11/2010 | Hutchinson ................... 715/736 |
| 2011/0213676 | A1* | 9/2011 | Singh et al. .................. 705/26.7 |
| 2012/0150662 | A1* | 6/2012 | Hannon et al. ............. 705/14.73 |

OTHER PUBLICATIONS

Ahuja et al., Perceived Disorientation: An Examination of a New Measure to Access Web Design Effectiveness, Google 2001, pp. 15-29.*

Mulvenna et al., Personalization on the Net using Web Mining, ACM 2000, pp. 122-125.*

Garofalakis et al., Web Site Optimization Using Page Popularity, IEEE 1999, pp. 22-29.*

Jan et al. An Optimization Model for Web Content Adaptation, Google 2006, pp. 953-965.*

International Search Report and Written Opinion for International Application No. PCT/US2007/069496, mailed Feb. 2, 2009, 10 pages.

Becamel, Philippe, International Preliminary Report on Patentability in PCT/US2007/069496, mailed Apr. 23, 2009, 8 pages.

Snapshot from Apr. 16, 2003, howstuffworks.com, Brain, Marshall, "How Internet Cookies Work," [online] Retrieved from the Internet URL: http://web.archive.org/web/20030416025353/http://computer.howstuffworks.com/cookie3.htm, 2 pages.

"ProHTML ticker, Dynamic Drive," Archived Jan. 1, 2005, [online]; Retrieved from the Internet URL: http://www.dynamicdrive.com/dynamicindex2/prohtmlticker.htm, 2 pages.

Raggett et al., "HTML 4.01 Specification, W3C Recommendation," [online] [retrieved on Dec. 24, 1999]; Retrieved from the Internet URL: http://www.w3.org/TR/1999/REC-htm1401-19991224, 389 pages.

Snapshot from Oct. 29, 2005, Kefta—Solutions—Customer Acquisition, "Customer Acquisition—drive more customers with greater efficiency," [online]. Retrieved from the Internet URL: http://web.archive.org/web/20051029081141/www.kefta.com/optimization-solutions/customeracquisition.html, 3 pages.

Snapshot from Apr. 27, 2006, Kefta's Dynamic Targeting Solution, "It's about creating a meaningful and relevant experience for your visitors", [online]. Retrieved from the Internet URL: http://web.archive.org/web/20060427125859/www.kefta.com/overview/approach.html, 2 pages.

Snapshot from Apr. 27, 2006, Kefta—Dynamic Targeting—the next generation of website personalization, "At Kefta, we believe in delivering the best message at the best time", [online]. Retrieved from the Internet URL: http://web.archive.org/web/20060427132429/www.kefta.com/overview/index.html, 2 pages.

Snapshot from Apr. 24, 2006, Offermatica: General A/B Test Demo, "What is Offermatica?", [online]. Retrieved from the Internet URL: http://web.archive.org/web/20060422201155/www.offermatica.com/demos/ab.html, 7 pages.

Snapshot from Apr. 24, 2006, Offermatica: Hosted A/B testing, multivariate testing, and landing page optimization tools, "What is Offermatica?", [online]. Retrieved from the Internet URL: http://web.archive.org/web/20060422201114/www.offermatica.com/whatis-1.0.html, 2 pages.

Snapshot from Apr. 24, 2006, Offermatica: How it Works, [online]. Retrieved from the Internet URL: http://web.archive.org/web/20060428054148/www.offermatica.com/whatis-1.1.1.html, 1 page.

Snapshot from Apr. 28, 2006, Optimost: Improve conversion rates on any landing page, splash page, jump page, "Maximize Conversion Rates Increase Your Revenue", [online] Retrieved from the Internet URL: http://web.archive.org/web/20060425212837/www.optimost.com/, 1 page.

Snapshot from Apr. 23, 2006, Touch Clarity—Technology, "Control Groups", [online]. Retrieved from the Internet URL: http://web.archive.org/web/20060503215906/www.touchclarity.com/technology/detail.php?id=78, 1 page.

Snapshot from Apr. 23, 2006, Touch Clarity—Technology, "Targeting Engine", [online]. Retrieved from the Internet URL: http://web.archive.org/web/20060503215705/www.touchclarity.com/technology/detail.php?id=76, 1 page.

Snapshot from Apr. 23, 2006, Touch Clarity—Technology, "Implementation", [online]. Retrieved from the Internet URL: http://web.archive.org/web/20060503215833/www.touchclarity.com/technology/detail.php?id=80, 1 page.

Snapshot from Apr. 23, 2006, Touch Clarity—Technology, "Visitor Profiling", [online]. Retrieved from the Internet URL: http://web.archive.org/web/20060503215758/www.touchclarity.com/technology/detail.php?id=77, 1 page.

DeGroot, "Onmouseover div swap gives flickering effect," webmaster-talk, Jan. 18, 2008, 3 pages.

JavaScript Kit, "Conditional Compilation of Jscript/ JavaScript in IE," 1997-2008, 2 pages.

Vasilik, "Advanced Experiment Techniques", Google Website Optimizer WOAC Summit '08, Nov. 11, 2008, 10 pages.

HTML Tutorial-Attributes, tizag.com, available at http://web.archive.org/web/20081007121302/http://tizag.com/thmlT/htmlattributes.php (archived Dec. 22, 2007).

Writing HTML, 27b. JavaScript-Dynamic Content, Maricopa Center for Learning and Instruction (MCLI), available at http://web.archive.org/web/20081013220058/http://www.mcli.dist.maricopa.edu/tut/tut27b.html (archived Dec. 22, 2007).

Yeeeev, JavaScript—controlling the insertion point for document.write, Stack Overflow, available at http://stackoverflow.com/questions/1536970/javascript-controlling-the-insertion-point-for-document-write (original post Oct. 8, 2009).

* cited by examiner

National Bicycle
Council Email
Newsletter

Please Provide us with the following information and after
confirmation, we'll start sending you our email newsletter Email*

First Name

Last Name

Zip Code

" * " indicates a mandatory field.

Interests (check all that apply):
- ☐ Safety/Community Awareness
- ☐ Healthy Lifestyle
- ☐ Leisure Rides
- ☐ Competition
- ☐ Mountain Biking
- ☐ Road Cycling Submit

FIG. 4A          400

Thank You for Registering!!

You will receive an email from us shortly.

FIG. 4B          402

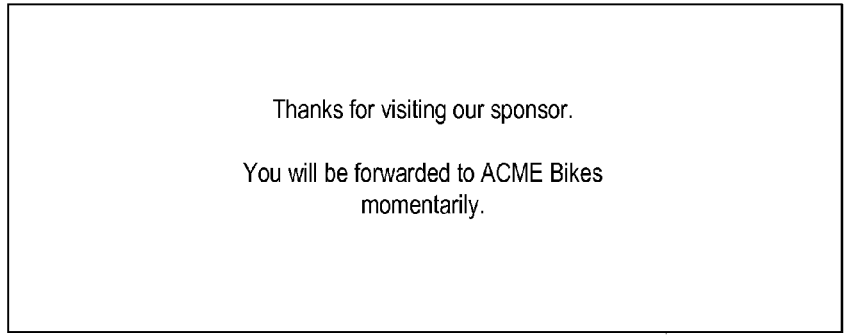

Thanks for visiting our sponsor.

You will be forwarded to ACME Bikes momentarily.

Place the following Control Script between the "<head>" and "</head>" tags of the test page:
www.nationalbicyclingcouncil.org/index.html <script><!-- Control Script ... //--></script>

Place the following Tracker Script between the <body> and </body> tags of the test page:
www.nationalbicyclingcouncil.org/index.html
and the conversion page:
www.nationalbicyclingcouncil.org/acmebikesforward.html <script><!-- Tracker Script ... //--></script>

Designate up to 8 variable sections in your test page:
www.nationalbicyclingcouncil.org/index.html
using the following format:

<script>utmx_section("NAME_OF_SECTION")</script>DEFAULT_VALUE</noscript>

```
<head>                                              ┌─ 702
 <script><!-- Control Script ... //--></script>
 ...
</head>
...
<body>
...
<H1>
 <script>utmx_section("Header")</script>Come Ride With Us!</noscript>  ─ 706
</H1>
...                                                                    ─ 708
 <script>umtx_section("Image")</script><img src=racer.jpg></noscript>
...                                                                    ─ 710
 <script>umtx_section("Text")</script>The National Bicycle Council is dedicated to promoting health,
 knowledge, and safety to the benefit of bicycle enthusiasts nationwide.</noscript>
...
 <script><!== Tracker Script ... //--></script>  ─ 704
</body>
```

```
...
<body>
...
<H1>Thanks for visiting our sponsor.<BR>
You will be forwarded to ACME <BR> Bikes momentarily
</H1>
...                                              ─ 802
 <script><!== Tracker Script ... //--></script>
</body>
```

Schema Selection

Please select the sections that are to be varied for this experiment:

| Name | Include |
|---|---|
| Header | ☒ |
| Image | ☐ |
| Text | ☒ |

| Experiment_ID | Section Names | |
|---|---|---|
| 123456 | Header, Text | ... |
| 987654 | Image, Text | ... |

FIG. 11A

| Experiment_ID | Section Name | |
|---|---|---|
| 123456 | Header | ... |
| 123456 | Text | ... |
| 987654 | Image | ... |
| 987654 | Text | ... |

FIG. 11B

| Experiment_ID | Page_ID | |
|---|---|---|
| 123456 | 7777 | ... |
| 987654 | 7777 | ... |

FIG. 11C

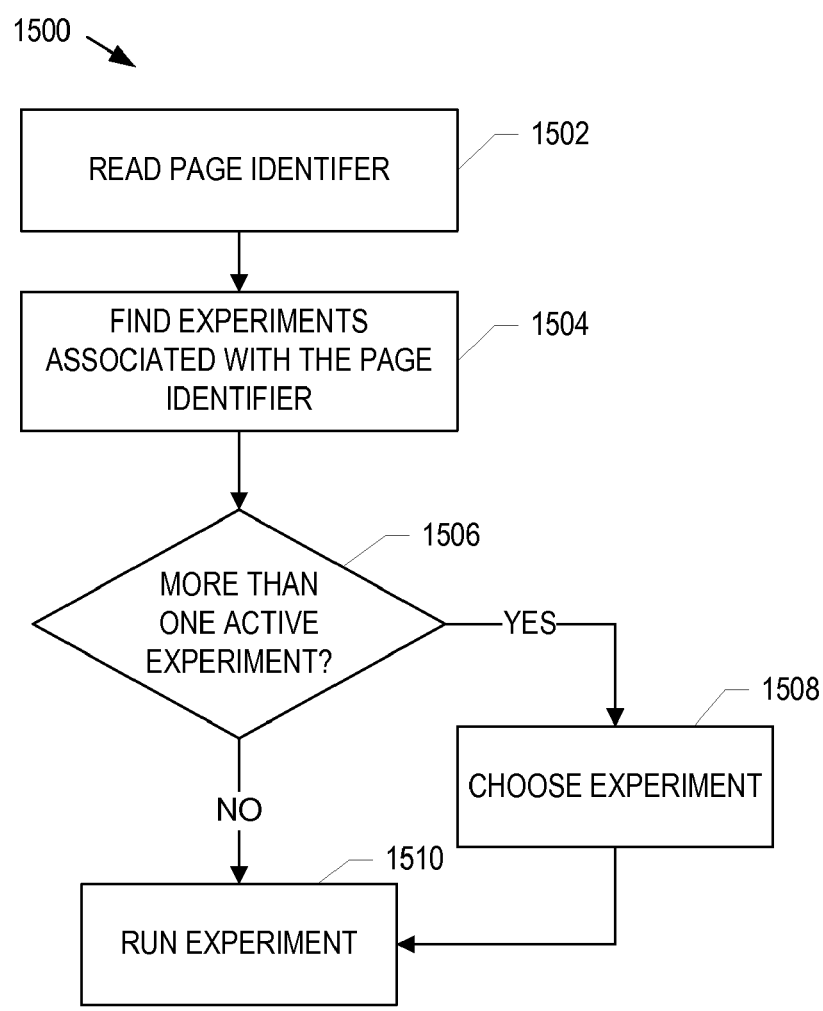

RUNNING MULTIPLE WEB PAGE EXPERIMENTS ON A TEST PAGE

BACKGROUND

The present disclosure relates to testing variations in web page content.

Web pages available on modern websites, such as websites available on the Internet, are powerful communication tools for disseminating information regarding current events, organizations, and other items of interest to website visitors. Web pages can also provide targeted advertising of products and services. The content of web pages used to convey this information and deliver these advertisements varies considerably. Selections regarding style, graphics, and layout impact visitors' responses to the information offered on the web page, and seemingly small changes in web page appearance can sometimes dramatically change the effect of the web page on visitors.

The effectiveness of differing combinations of web page content can be gauged by measuring visitor responses to varying web page content. Through experimentation, effective website content can be identified.

SUMMARY

In general, one aspect of the subject matter described in this specification can be embodied in methods that include the actions of receiving a page identifier of a test page having code defining a plurality of variable content sections, retrieving an experiment identifier of a first experiment from the multivariate experimentation system based on the page identifier, retrieving variable content of the first experiment based on the experiment identifier of the first experiment, sending the variable content of the first experiment to a first web browser for insertion into a first set of the variable content sections, retrieving an experiment identifier of a second experiment from the multivariate experimentation system based on the page identifier, retrieving variable content of the second experiment based on the experiment identifier of the second experiment, and sending the variable content of the second experiment to a second web browser for insertion into a second set of the variable content sections. Other embodiments of this aspect include corresponding systems, apparatus, and computer program products.

An additional aspect of the subject matter described in this specification can be embodied in methods that include the actions of receiving respective variable content section identifiers for the variable content sections of the test page, where the variable content of the first experiment includes a variable content item identified from among a plurality of variable content items based on the experiment identifier of the first experiment and the variable content section identifier of at least a first one of the variable content sections, and the variable content of the second experiment includes a variable content item identified from among a plurality of variable content items based on the experiment identifier of the second experiment and the variable content section identifier of at least a second one of the variable content sections.

Particular embodiments of the subject matter described in this specification can be implemented to realize one or more of the following advantages. A test page can be instrumented once for use in multiple web page experiments to avoid frequent changes to web page code of a test page for purposes of experimentation. Resource consuming verification steps can also potentially be avoided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A illustrates an example data entry form web page as rendered by a web browser.

FIG. 4B illustrates an example confirmation web page.

FIG. 5 illustrates an example sponsor forward web page.

FIG. 6 is an example message including instructions for placing variable content sections in a test page.

FIG. 7 is an example of HTML source of a test web page having installed scripts.

FIG. 8 is an example of HTML source of a conversion web page.

FIG. 10 is an example user interface page for presenting extracted variable content section identifiers.

FIG. 11A shows an example records for storing variable content section identifiers selected for an experiment.

FIG. 11B shows a set of example records for storing variable content section identifiers.

FIG. 11C shows a set of example records that associate a page identifier with multiple experiment identifiers.

FIG. 14 illustrates an example set of records for storing variable content items.

FIG. 15 is an example process performed by an experimentation system for running an experiment on a test page that can have more than one associated experiment.

Like reference numbers and designations in the various drawings indicate like elements.

DETAILED DESCRIPTION

Figure 1:
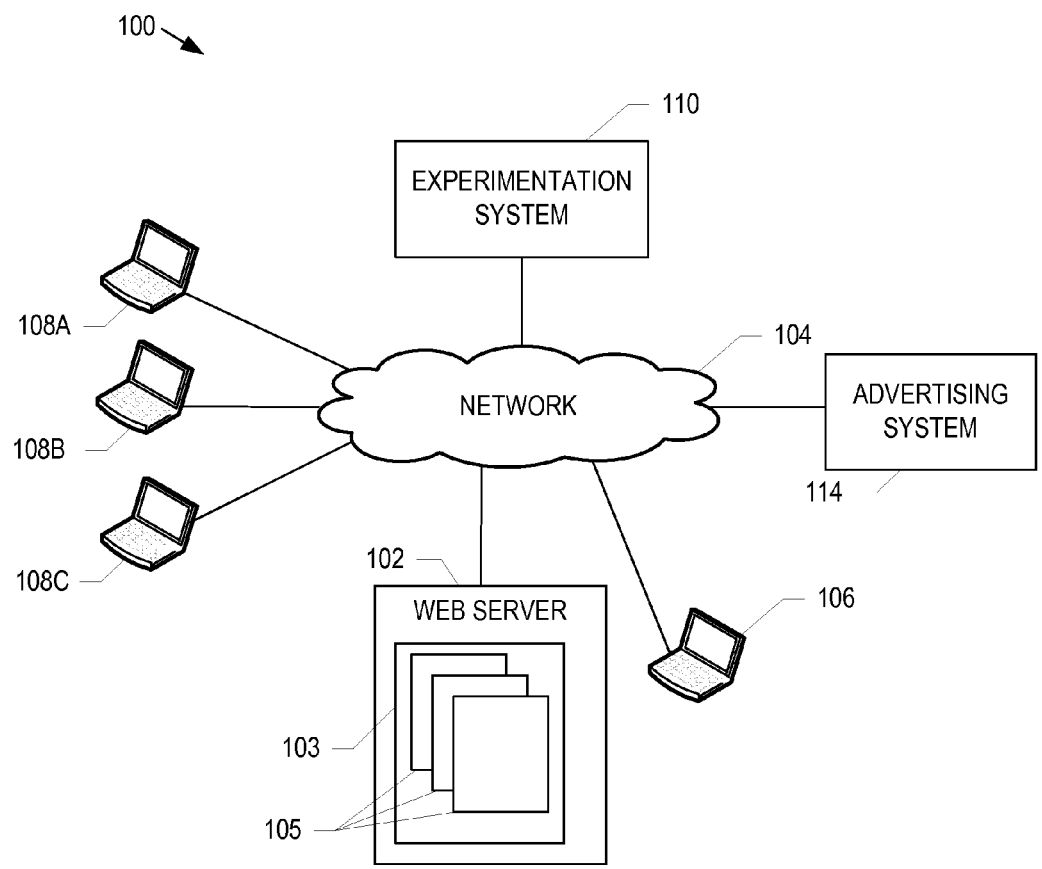
FIG. 1 is a block diagram of an example environment of an automated web page experimentation system.

FIG. 1 is a block diagram of an example environment 100 of an automated web page experimentation system 110. A web server 102 is connected to a network 104 such as the Internet. A website operator, designer, and/or a publisher (an employee of a business entity, for example, referred to collectively below as operators) using computer 106 can create, maintain, and otherwise administrate a website 103 having one or more web pages 105 stored on the web server 102. The web server can serve web page content 105 of the website 103 to visitors such as users of user computers 108A-108C through web browser software installed on the user computers 108A-C.

The web pages 105 include hypertext markup language (HTML) code that is interpreted by the web browsers to render the pages for display to a visitor, for example, on a display of the computer 108A. The web pages 105 can also include scripts. A script, in this context, refers to code embedded in a web page. A script can be written in, for example, Javascript.

Content of the web pages 105 of the website 103 can be directed toward one or more goals such as, for example, collecting names of visitors/customers, selling a product or service, directing traffic to more pages 105 of the website 103, and/or directing traffic to the website of a sponsor. Website operators or others responsible for website content generally select website content to achieve these goals. To optimize the content of one or more web pages 105 to reach a given goal, experimentation system 110 can be used to conduct tests that present one or more web page variations to visitors and record the effectiveness of each variation in achieving the goal. A test that presents multiple variations in web page and/or website content is referred to herein as a multivariate test. A webpage operator (or experimentation system user) can access the experimentation system 110 to create experiments, manage experiments, and view reports regarding the effectiveness of variations in content of one or more web pages of the website 103.

In some implementations, a website operator utilizes an advertising system 114 to direct visitor traffic to the website 103. For example, a website operator can arrange to have advertisements, including hypertext links directing users to the website 103, placed on other Internet web pages. The pages selected for placement of the advertisements can, for example, be search engine results pages generated after a search engine user enters a search string including one or more words selected by a website operator as relevant to the content of the website 103. If the website 103 includes information regarding bicycling, for example, a website operator might arrange for advertisements to be placed on results pages for search queries including the word "cycling". In addition, advertisements can be placed by the advertising system on web pages operated by others who agree to partner with the advertising system in delivering advertisements. The advertising system can then place advertisements for the website 103 on pages determined to have content that is contextually significant to the website 103. For example, an advertisement for the website 103 might appear on another bicycling related website. A website operator can agree to pay an owner of the advertising system a fee for each advertisement shown, and/or a fee for each time the advertisement successfully directs a visitor to the website 103.

The experimentation system can maintain records for a number of website operators. A website operator (or a team of website operators) can be assigned a user account on the experimentation system. By logging into the experimentation system a website operator can view experiments that are associated with the user account. For example, the website operator can create new experiments, start and stop experiments, and view experiment progress. The experimentation system can generate an experiment identifier for a newly created experiment. An experiment identifier can be associated with a user account, by for example storing the experiment identifier in a field of a database record that includes a user account identifier in another field.

In an implementation, a page identifier can be assigned to a test page, and multiple experiments can be associated with the page identifier. For example, the page identifier can be stored in a field of a database record that includes an experiment identifier in another field. The page identifier can be a test page URL or a page identifier assigned by the experimentation system 110. Multiple experiment identifiers can be associated with a page identifier corresponding to the test page. Multiple experiments associated with the same test page identifier can be conducted simultaneously and/or consecutively.

Scripts installed on a test page adapt the page for use with the experimentation system 110. The process of installing scripts on a test page is referred to as instrumentation or instrumenting a test page. Instrumentation of the test page generally includes a website operator modifying the code of a test page to insert one or more scripts. For example, the website operator can open the test page in a text editor or an HTML editor and modify the HTML code of the test page, or an old test page file can be deleted and replaced with a new file.

Figure 2:
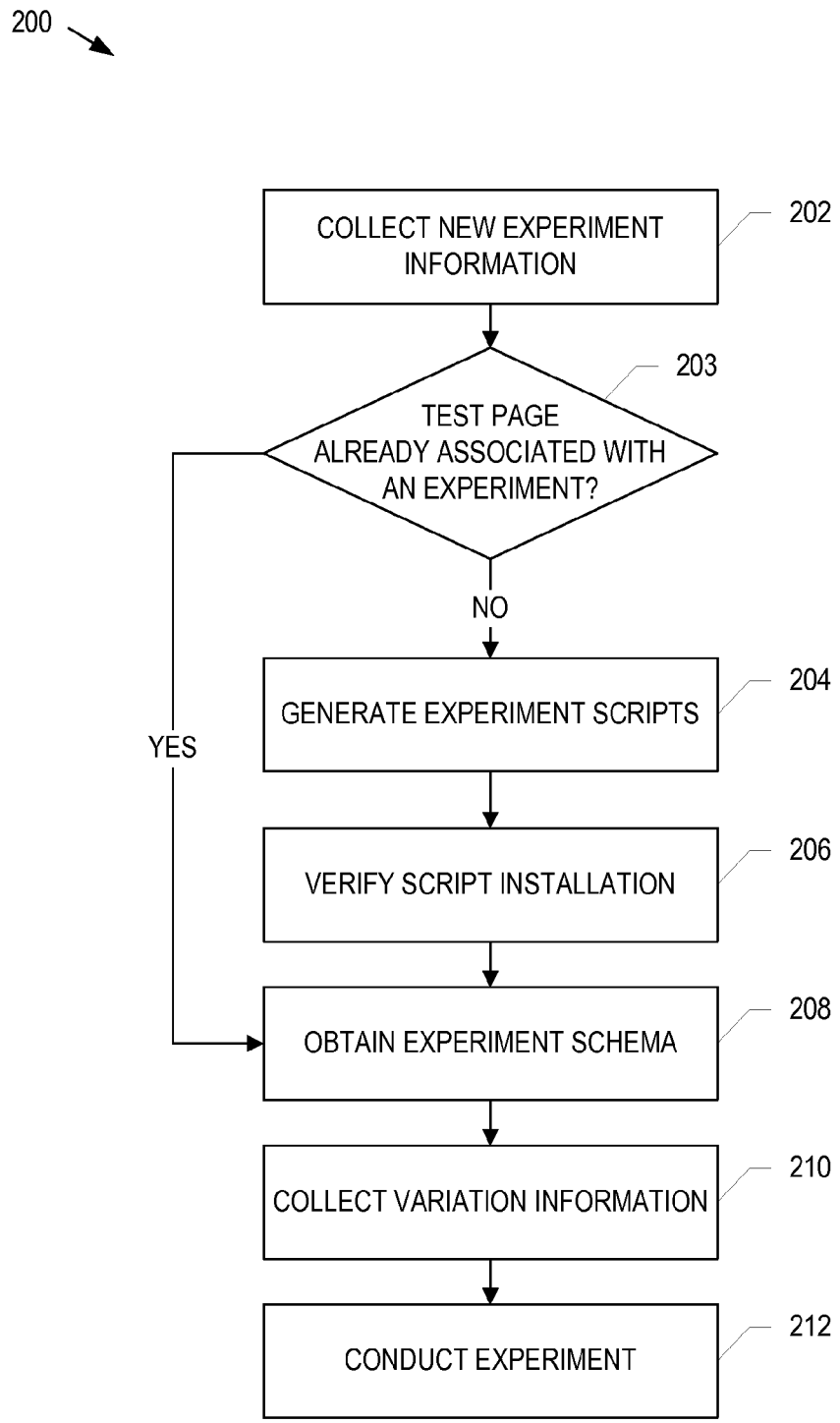
FIG. 2 is a flowchart of an example method of performing a web page experiment using an experimentation system.

FIG. 2 is a flowchart 200 of an example method of performing a web page experiment using an experimentation system 110. A website operator accesses a user interface (for example, a web based interface) of the experimentation system 110 using a computer with web browser software functioning as a user interface device. The system collects the experiment information (202). For example, the experimentation system 110 can prompt the website operator to enter a name of a new experiment, a URL of a test page for the experiment, and a URL of a conversion page for the experiment. The test page is the page on which the experimentation system will conduct a multivariate test. The conversion page is a page designated by a website operator as a goal. A conversion occurs, and a given test page combination can be credited with the conversion, if a visitor reaches the conversion page after viewing the test page combination. The experiment information can be stored in the experimentation system 110 in a way that identifies the experiment identifier. For example the experiment information can be stored in a database record that includes the experiment identifier.

The experiment system 110 checks to determine if the test page identified by the user is already associated with an experiment (203). For example, the experiment system can access the URL of the test page to determine if experimentation system scripts have already been installed, and/or the experimentation system 110 can search database records to determine if the URL of the test page is associated with an existing experiment. If the URL of the test page is associated with an existing experiment, the process can proceed to obtaining experiment schema for the new experiment (208).

If the test page is not already associated with an experiment, the experimentation system 110 generates one or more scripts for use on the test and/or conversion pages of the experiment (204). The experimentation system 110 can provide the scripts to a website operator through the user interface or in an email, for example. Instructions for installing the scripts on the test and conversion pages are also provided.

The scripts generated by the experimentation system can be installed by inserting the scripts into the hypertext markup language of the test and/or conversion pages. The experimentation system can provide instructions for placing variable content sections in the test page. In an implementation, variable content sections can be added to a test page for use with multiple experiments. For example, one set of variable content sections can be used for a first experiment run on the test page, and a second set of variable content sections can be used for a second experiment run on the test page. The two sets can have one or more variable content sections in common. Placing variable content sections on a given test page for use with multiple experiments allows the test page to be instrumented once, for use with multiple experiments.

The website operator can indicate that the scripts have been installed using the user interface of the experimentation system 110, and the experimentation system can verify that the scripts have been installed (206).

The experimentation system obtains an experiment schema (208). An experiment schema includes the name (or other identifier) and number of variable content sections that are to be varied during the experiment. An experiment schema can be entered manually by a website operator into the experimentation system 110. For example, the website operator can enter the name of one or more variable content sections that are found on the test page. The name entered by the website operator can correspond to a respective variable content section script included in the test page.

In some implementations, potential experiment schema is captured by the experimentation system 110 by parsing the code of the test page. If variable content sections are found, the experimentation system captures information from these sections to use in defining a schema for the experiment. Any variable content sections found on the test page can be presented to a website operator through the user interface. The website operator can then select the variable content sections that are to be included in the experiment.

The obtained schema is then used to prompt for and collect variation information for the experiment from the website operator (210). The variation information will be inserted into corresponding variable content sections by the experimentation system as explained below. The variation information is stored for use by the experimentation system. The experiment is then conducted (212). During the experiment, varying combinations of the test page are displayed to visitors, and the respective number of conversions for the combinations displayed are recorded by the experimentation system 110.

Figure 3:
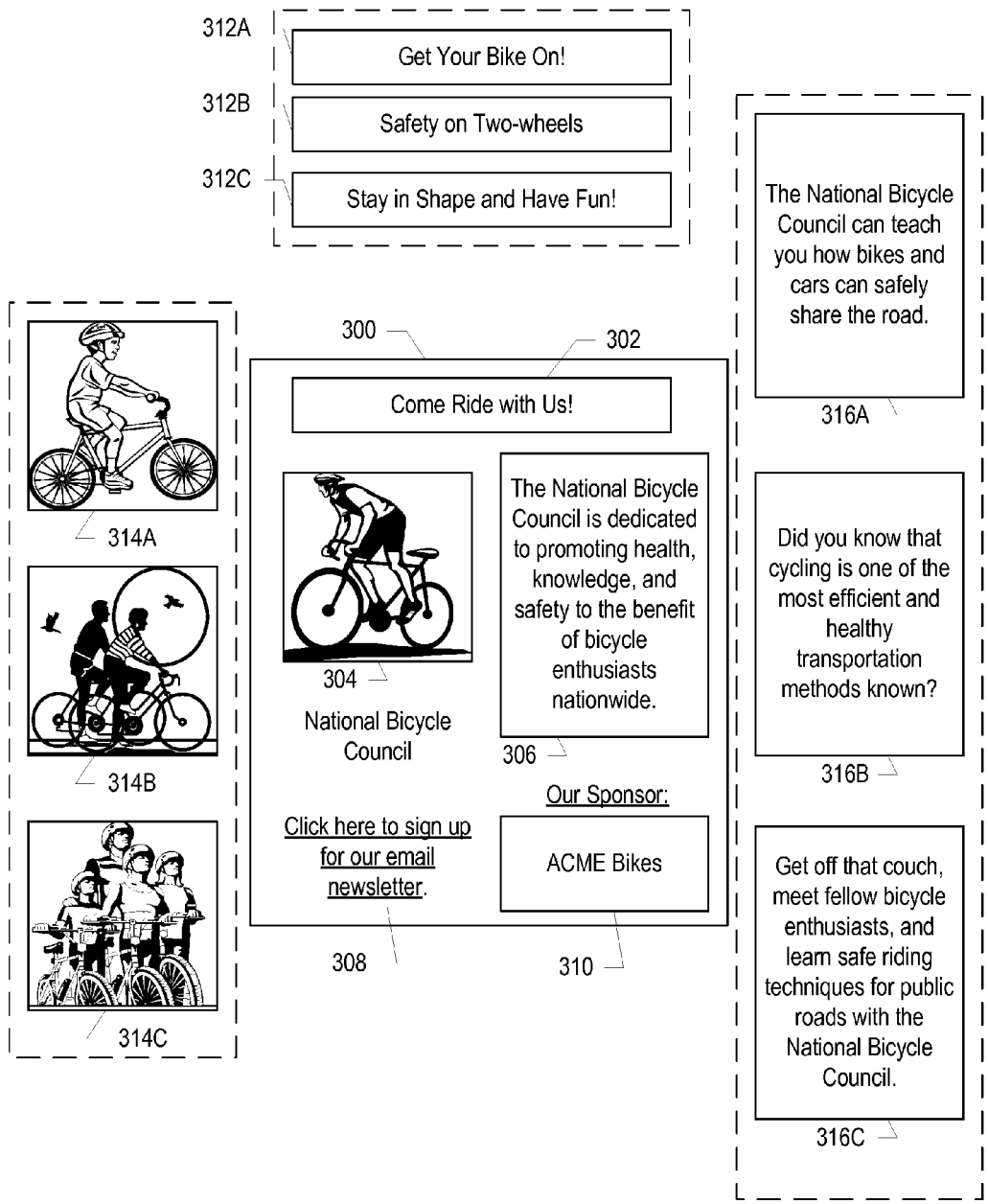
FIG. 3 is a diagram of an example test page and variable content items.

FIG. 3 is a diagram of an example test page 300 and variable content items. In some implementations, an advertisement of the advertising system 114 links to the test page 300. Test page 300 includes a heading 302, an image 304, text block 306, form link 308, and sponsor link 310. Variable content items include heading variations 312A, 312B, and 312C, image variations 314A, 314B, and 314C, and text variations 316A, 316B, and 316C. The web page 300 has default content for the heading 302, image 304, and text block 306. The URL of the test page 300 is provided to the experimentation system 110 through the user interface.

Through experimentation, the effectiveness of the default content and combinations of the variable content items in achieving a goal can be measured. To measure the effectiveness, a goal is selected as the conversion page. The selected goal can be, for example, user visits to the newsletter signup page linked to by the link 308, actual data entered and submitted to that page, or user visits to the site sponsor linked to by link 310.

If the selected goal is a user visit to the newsletter sign up page, the conversion page can be a page having a newsletter signup form such as shown in FIG. 4A. FIG. 4A illustrates an example data entry form web page 400. If the selected goal is instead an actual submission of the newsletter signup form, the conversion page can be a confirmation page such as the page 402 shown in FIG. 4B. FIG. 4B illustrates an example confirmation web page 402.

If the selected goal is a user visit to a website sponsor, the confirmation page can be a page linked to by the sponsor link 310. FIG. 5 illustrates an example sponsor forward web page 500. The sponsor link 310 links to the forward page 500 which, after a short delay, redirects the user's web browser to the sponsor website. The URL of the conversion page selected by the website operator as the goal is provided to the experimentation system 110 through the user interface.

As an illustrative example, the code of the test page 300 can be instrumented with three variable content scripts corresponding to three variable content sections. The variable content sections can include the header 302, the image 304, and the text 306. A given experiment conducted on the test page 300, however, need not vary the content of all three sections. For example, a first experiment can be conducted that varies the content of the header 302, a second experiment can be conducted that varies the image 304, and a third experiment can be conducted that varies the text 306. For further example, a first experiment can be conducted that varies the header 302 and the image 304, and a second experiment can be conducted that varies the image 304 and the text 306. These experiments can be run consecutively, or simultaneously. The experimentation system can switch from performing one experiment to the other without the need for the code of the test page 300 to be changed. Two or more experiments can be run during a period of time in which the test page code remains unchanged. That is, the variable content sections of the test page code used to instrument the experiment remain static. For example, a first experiment can be run for a first experiment period and visitor responses to content combinations delivered to the visitors can be recorded during the experiment period. A second experiment can be run for a second experiment period and visitor responses to content combinations delivered to the visitors can be recorded during the second experiment period. The first experiment period and the second experiment period can overlap such that two experiment are being run on the same test page at the same time. The experimentation system can spread visitor traffic to the test page across multiple running experiments based on, for example, whether a given visitor has a cookie on their browser indicating that content of one of the running experiments has previously been served to that browser, and/or a traffic balancing goal across the experiments.

FIG. 6 is an example message 600 including instructions for placing variable content sections in a test page. The example message 600 includes a control script and a tracker script. Scripts can include, for example, a page identifier that uniquely identifies the page in the experimentation system 110. The control script can include code that when interpreted by a web browser causes the web browser to contact the experimentation system 110 to retrieve content for display by the browser in the variable content sections of the web page 300. The tracker script can include, for example, code for storing a cookie in memory of a computer on which a web browser is running (computer 108A, for example). The cookie can be used, for example, to determine whether a user has visited the test page within a certain period of time prior to visiting the conversion page as well as determining which combination of variable content was displayed to the user on the test page. For example, the cookie can include the experiment identifier of a test page accessed by the user, the time the test page was accessed, and/or indicators that denote which variable content was displayed to the user in respective variable content sections.

In an implementation, the contents of a cookie delivered to a browser by the experimentation system 110 through the tracker script includes an experiment identifier. The cookie can also include the page identifier. The cookie can be used to determine which of a number of multiple experiments associated with the page identifier have been delivered to a given browser.

The example message 600 includes a script format for variable content sections to be placed on the test page. The format shown in the example is: "<script>utmx_section ("NAME_OF_SECTION")</script>DEFAULT_VALUE</ noscript>" where NAME_OF_SECTION is a name given to the variable content section by the website operator that can serve as a variable content section identifier. DEFAULT_VALUE is the default page content for the given variable content section.

FIG. 7 is an example of HTML source 700 of a test web page having installed scripts. The HTML source includes a control script 702 and a tracker script 704. The HTML source also includes three variable content script sections 706, 708, and 710. The three variable content script sections correspond to the variable content sections of the example test page 300. The variable content script section 706 corresponds to the variable content section 302 of the test page 300. This section has been given the name "Header" by the website operator, and default content of "Come Ride With Us!". The variable content script section 708 corresponds to the variable content section 304 of the test page 300. This section has been given the name "Image" by the website operator, and default content of "<img src=racerjpg>". The file "racer.jpg" is the image file of the image shown in section 304 of the test page 300. The variable content script section 710 corresponds to the variable content section 306 of the test page 300. This section has been given the name "Text" by the website operator, and default content matching the text shown in section 306 of the test page 300.

FIG. 8 is an example of HTML source 800 of a conversion web page. The HTML source 800 corresponds to the example page 500 of FIG. 5 and includes a tracker script 802 that has been installed by the website operator.

Once the scripts have been installed on the test page and conversion page, the website operator can to initiate a script verification process. The operator can do this, for example, using the user interface of the experimentation system 110. The verification process can optionally check the HTML source of the web pages at the URL locations indicated for the experiment to determine if the scripts are installed correctly.

The website operator can manually enter the schema for the experiment into the user interface of the experiment system. The manually entered schema can include the names (or other identifier) of variable content sections that have corresponding variable content scripts in the source of the test page that are to be used in the experiment. The entered schema can include all of the instrumented variable content sections or some subset of those variable content sections.

Figure 9:
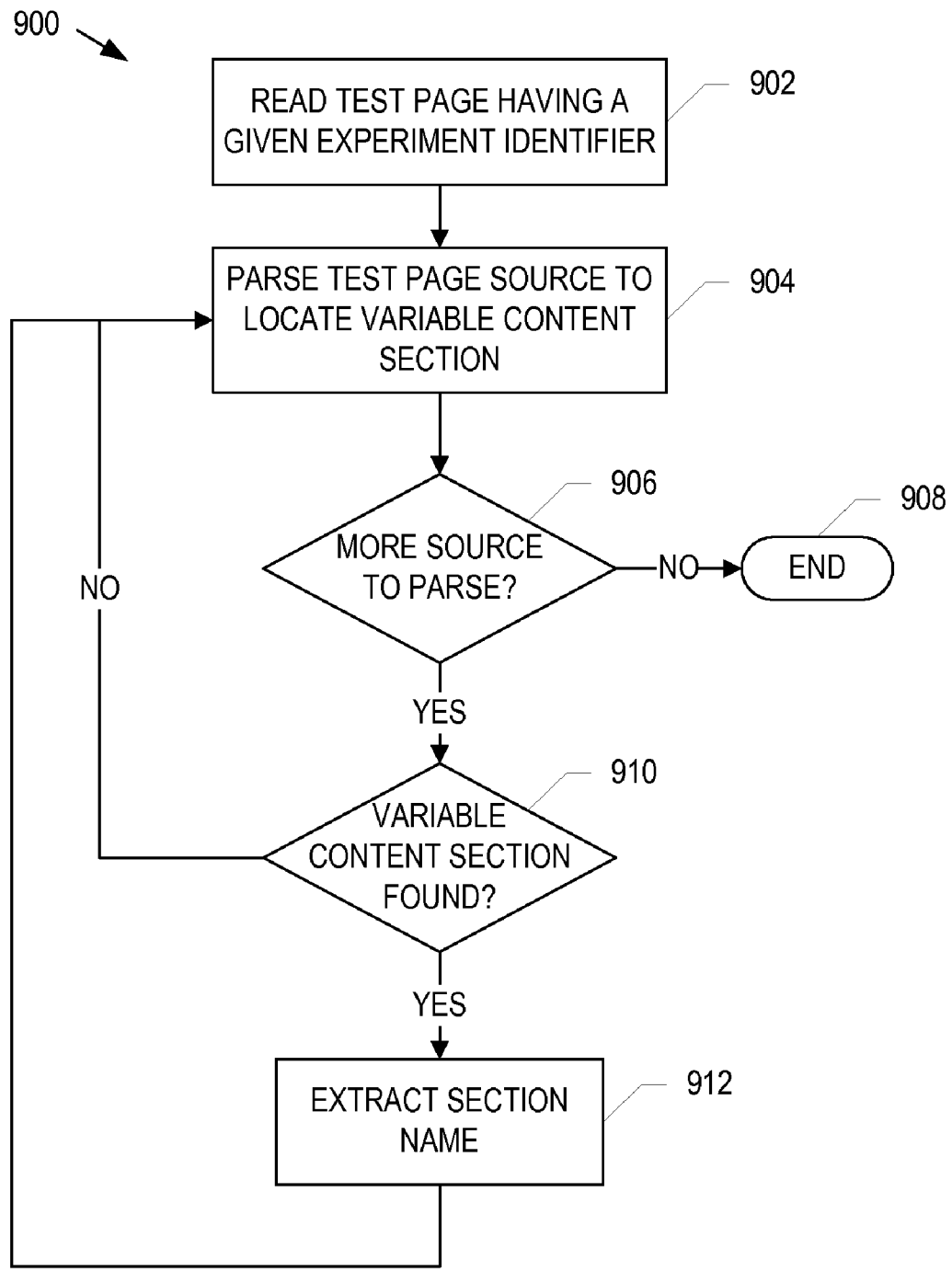
FIG. 9 is a flowchart of an example process for scanning a test web page to extract a potential experiment schema.

In some implementations, the experimentation system 110 reads the HTML source of the test page to scan for variable content scripts. FIG. 9 is a flowchart of an example process 900 for scanning a test web page to extract a potential experiment schema. The test page is read by the experimentation system 110 (902). The test page can have a corresponding page identifier included in its code. The experiment identifier can be located, for example, in one or more of the scripts installed on the test page. The experimentation system 110 begins parsing the HTML source of the test page to locate a variable content section (904). If there is no more source to parse (906) the process ends (908). The process loops to continue parsing the test page if a variable content section is not encountered (910). If a variable content section is found (910) the name of the variable content section is extracted (912). For example, if the process 900 reads the example test page source code 700, the process reads the source code, and extracts section names "Header", "Image" and "Text". The names of the extracted sections can be presented to the website operator as selectable options for inclusion in the experiment.

FIG. 10 is an example user interface 1000 page for presenting extracted variable content section identifiers. The extracted names are presented along with a check box for the user to indicate which variable content sections are to be included in the experiment. After selections are made they can be submitted to the experimentation system 110 by selecting the "continue" button. Selected variable content section identifiers can be associated with the experiment identifier of the experiment in the experimentation system 110.

FIG. 11A shows example records for storing variable content section identifiers selected for an experiment. The records include an experiment identifier field as well as a section names field. The section names field includes the captured experiment schema in a comma separated list. The record can include additional fields. The record 1100 shows sections names that correspond to those shown as selected in FIG. 10 stored with an experiment identifier "123456". The record 1102 shows section names selected for another experiment that has an experiment identifier of "987564". The section names of record 1102 can be selected during the creation of another experiment to be run on the same test page as the experiment having the identifier "123456". For example, the process of FIG. 2 can be repeated. However, in this case, the test page is already associated with an experiment (203) so that the process can proceed to obtaining experiment schema (208). The second experiment can therefore be initiated without the need for changes to be made to the code of the test page.

FIG. 11B shows a set of example records 1104 for storing variable content section identifiers. This format is an alternative to that shown in FIG. 11A. The selected variable content section identifiers are stored in a plurality of records, each variable content section identifier being stored in a separate record. The records can include additional fields.

FIG. 11C shows a set of example records that associate a page identifier with multiple experiment identifiers. The experiments "123456" and "987654" are associated with the test page having the identifier "7777". The records can include additional fields.

Figure 12:
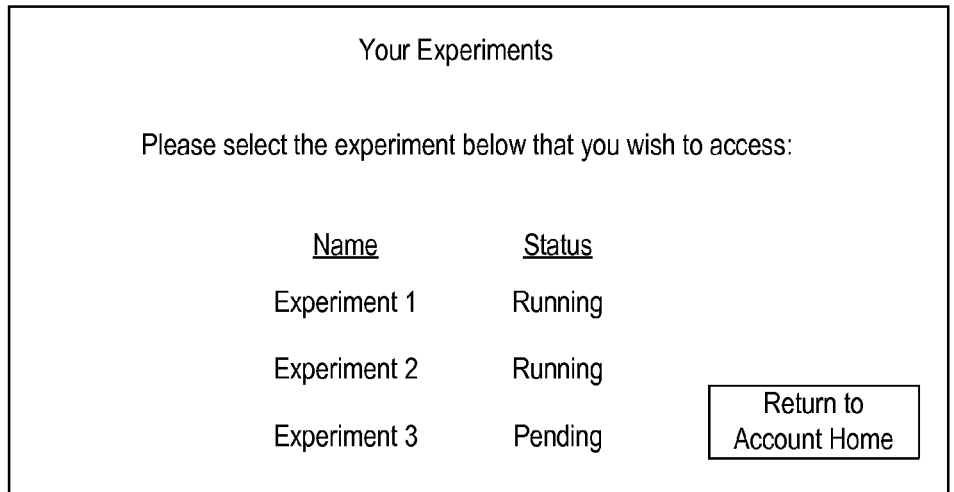
FIG. 12 is an example user interface page of an experimentation system.

FIG. 12 is an example user interface page 1200 of an experimentation system 110. The page 1200 can be displayed to a website operator upon logging into the experimentation system 110. The page 1200 shows a set of example experiments and their corresponding status. The page 1200 can be displayed, for example, in a web browser of the computer 108A. By selecting an experiment, through clicking on the experiment name, for example, a website operator can access the experiment to enter experiment information, start and stop the experiment, and/or see its progress.

Figure 13:
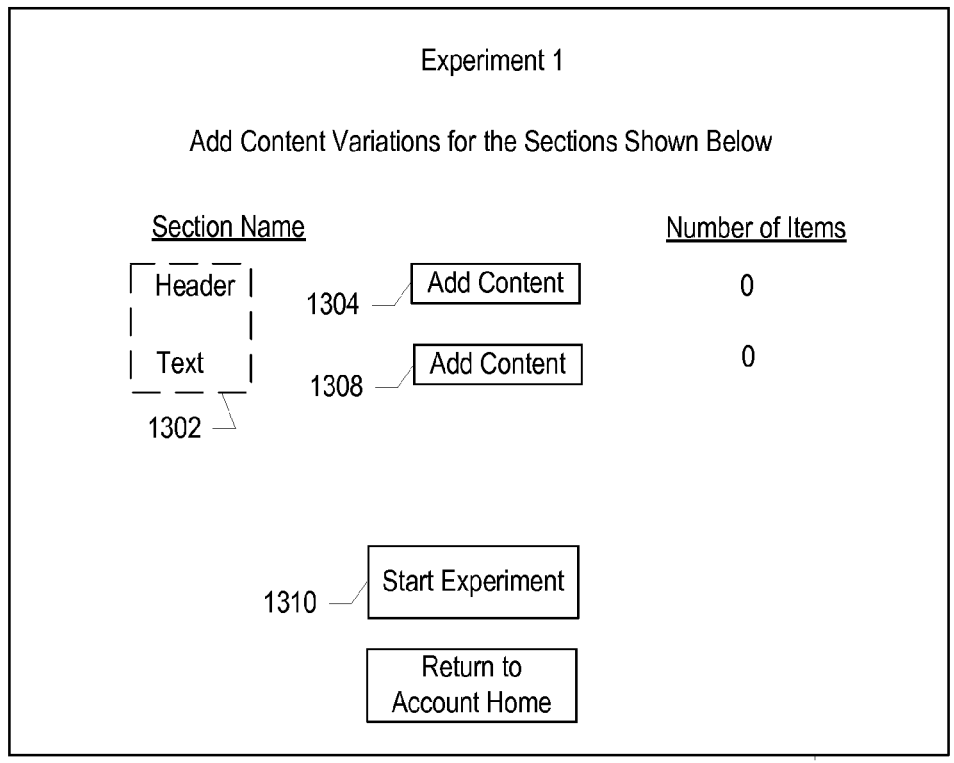
FIG. 13 is an example user interface experiment administration page.

FIG. 13 is an example user interface experiment administration page 1300. The page 1300 can be displayed, for example, in response to a user selecting an experiment of the web page 1200. The web page 1200 can include a link that references an experiment identifier. For "Experiment 1" which has a status of "running", the link can refer to an experiment for which the experimentation system 110 has previously obtained an experiment schema. For example, the experiment identifier can refer to an experiment for which the experimentation system 110 has previously received variable content selections from a website operator. The experiment administration page 1300 shows the variable content section identifiers 1302 that are associated with the selected experiment. For instance, "Experiment 1" can correspond to an experiment identifier "123456". The experimentation system can query a database table for records associated with the experimentation identifier "123456" to retrieve a previously stored variable content selections and display the names of variable content sections on the page 1300. The experimentation system can also query a database table to find any variable content items associated with the variable content sections, count those items, and display the resulting number of content items next to the corresponding section name on the page 1300.

In response to a website operator clicking the "Add Content" button 1304, a dialog box for accepting variable content items for the variable content section named "Header" can appear. The website operator can, for example, enter the variations in header content 312A-C of FIG. 3. In response to a website operator clicking the "Add Content" button 1308, a dialog box for accepting variable content items for the variable content section named "Text" can appear. The website operator can, for example, enter the variations in text content 316A-C of FIG. 3 by typing in the variations, pasting text into the forms, and/or uploading text files. The "Number of Items" column of web page 1300 can be updated by the experimentation system 110 to show the number of variable content items that have been added to the corresponding variable content section. The experiment can be started by selecting the "Start Experiment" button 1310.

FIG. 14 illustrates an example set of records 1400 for storing variable content items. The variable content items input to the system by a website operator though the interface page 1300 can be stored in the example records 1400. The records 1400 illustrate an example manner for storing the variable content of the "Header" and "Text" sections FIG. 3. The "Header" section can correspond to the header section 302 of FIG. 3. The records 1402 can store the variable content items for the header section 302. The "Text" section can correspond to the text section 306 of FIG. 3. The records 1406 can store the variable content items for the text section 306.

While the experiment is running, on the test page 300, for example, the experimentation system, through communication with the web browser of a visitor's computer running the scripts installed on the test page 300, varies the test page displayed to visitors by selectively replacing the content in the variable content sections with one instance of the corresponding variable content entered by the website operator into the experimentation system. A number of resulting test page variations can be produced that include combinations of default variable section content (one instance of a variation for a given variable content section is using the default content) and content stored in the experimentation system. The experimentation system balances the number or instances of that a given combination is displayed to visitors such that each of the combinations are displayed an approximately equal number of times. Traffic to the page 300 is tracked by the experimentation system which records the number of times a given combination of variable content achieves the designated goal for the experiment. A user interface of the experimentation system can provide the data recorded by the experimentation system so that the relative conversion rates of the test page combinations can be compared.

FIG. 15 is an example process 1500 performed by an experimentation system for running an experiment on a test page that has more than one associated experiment. A website visitor can visit the test page, and the visitor's web browser can execute the scripts on the test page. The page identifier included in the scripts can be passed to the experimentation system 110. The page identifier is read (1502) by the experimentation system 110. The experimentation system 110 searches its records to find experiments that are associated with the page identifier (1504). If one active experiment is found, the experimentation system runs that experiment (1510). If more than one active experiment is found, the experimentation system chooses between the active experiments (1508) and runs the chosen experiment (1510). The active experiment can be chosen based on a comparison of the states of the experiments (for example to balance traffic across the experiments) and/or a state represented by a cookie of the visitor's web browser (for example to keep a given user associated with an experiment for which the user has previously received content).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method for delivering content combinations to a test web page instrumented for use with multiple experiments of a multivariate experimentation system, comprising:
   receiving a page identifier of the test web page, the test web page having code defining a plurality of variable content sections, each variable content section of the plurality of variable content sections having a corresponding variable content section identifier;
   receiving a first experiment schema, the first experiment schema including a first set of identifiers associated with a first subset of variable content sections of the plurality of variable content sections;
   receiving a second experiment schema, the second experiment schema including a second set of identifiers associated with a second subset of variable content sections of the plurality of variable content sections;
   retrieving, from a plurality of experiment identifiers associated with the page identifier, a first experiment identifier of a first experiment that corresponds to the first experiment schema;
   retrieving a first set of variable content items based on the first experiment identifier and the first set of identifiers;
   sending the first set of variable content items to a first web browser for insertion into the first subset of variable content section of the test web page corresponding to the first set of identifiers, wherein the first set of variable content items includes a first particular subset of variable content items that are associated with a first effectiveness in achieving a goal, the goal being selected based on different types of user interactions with the test web page;
   retrieving, from the plurality of experiment identifiers associated with the page identifier, a second experiment identifier of a second experiment that corresponds to the second experiment schema;
   retrieving a second set of variable content items based on the second experiment identifier and the second set of identifiers, wherein the second set of variable content items includes a second particular subset of variable content items that are associated with a second effectiveness in achieving the goal; and
   sending the second variable content of the second experiment to a second web browser for insertion into the second subset of variable content sections of the test web page corresponding to the second set of identifiers.

2. The method of claim 1, wherein:
   sending the first set of variable content items of the first experiment to a first web browser and sending the second set of variable content items of the second experiment to a second web browser are performed during a time in which the first set of variable content sections and the second set of variable content sections of the test web page code remain static.

3. The method of claim 1, wherein:
   the first set of variable content items are identified from among a plurality of variable content items based on the first experiment identifier; and
   the second set of variable content items are identified from among the plurality of variable content items based on the second experiment identifier.

4. The method of claim 1, further comprising:
receiving variable content section identifiers corresponding to the plurality of variable content sections of the test web page, wherein:
the first set of variable content items are identified from among the plurality of variable content items based on the first experiment identifier and the first set of identifiers; and
the second set of variable content items are identified from among the plurality of variable content items based on the second experiment identifier and the second set of identifiers.

5. The method of claim 1, wherein:
the first subset of variable content sections corresponds to the first set of identifiers stored in the multivariate experimentation system in association with the first experiment identifier; and
the second subset of variable content sections corresponds to the second set of identifiers stored in the multivariate experimentation system in association with the second experiment identifier.

6. The method of claim 1, wherein:
the first subset of variable content sections and the second subset of variable content sections have at least one variable content section in common.

7. The method of claim 1, wherein:
the first experiment includes variable content stored in the multivariate experimentation system to be presented in the first subset of variable content sections on the test web page over a first experiment period to test visitor response to viewing the first subset of variable content sections; and
the second experiment includes variable content stored in the multivariate experimentation system to be presented in the second subset of variable content sections on the test web page over a second experiment period to test visitor response to viewing the second subset of variable content sections.

8. The method of claim 7, wherein:
the first experiment period overlaps with the second experiment period.

9. The method of claim 1, further comprising:
measuring the first effectiveness of the test web page in achieving the goal, wherein the first effectiveness is based on the test web page displaying the first particular subset of variable content items associated with the first experiment identifier of the first experiment and the first set of identifiers;
measuring the second effectiveness of the test web page in achieving the goal, wherein the second effectiveness is based on the test web page displaying the second particular subset of variable content items associated with the second experiment identifier of the second experiment and the second set of identifiers; and
identifying the most effective website content based on the first effectiveness and the second effectiveness.

10. A method for delivering content combinations to a test web page instrumented for use with multiple experiments of a multivariate experimentation system, comprising:
receiving a page identifier of the test web page, the test web page having code defining a plurality of variable content sections, each variable content section of the plurality of variable content sections having a variable content section identifier, the variable content section identifier being provided by a name, number, or other descriptor;
receiving a first experiment schema, the first experiment schema including a first set of identifiers associated with a first subset of variable content sections of the plurality of variable content sections of the test web page and being one experiment schema of a plurality of experiment schemas;
identifying a first experiment of one or more experiments associated with the page identifier, the first experiment corresponding to the first experiment schema;
for respective variable content section identifiers in the first set of identifiers:
searching for variable content associated with the first experiment and the respective variable content section identifiers;
if variable content associated with the first experiment and the respective variable content section identifiers is found:
selecting respective variable content items associated with the first experiment and the respective variable content section identifiers; and
transmitting the respective variable content items for placement on the test web page in variable content sections corresponding to the respective variable content section identifiers, wherein the variable content items include a particular set of variable content items being associated with an effectiveness in achieving a goal, the goal being selected based on different types of user interactions with the test web page.

11. The method of claim 10, further comprising:
if variable content associated with the first experiment and the respective variable content section identifiers that have been received is not found, transmitting an instruction to display default content in the variable content sections corresponding to the respective variable content section identifiers that have been received.

12. The method of claim 10, further comprising:
if variable content associated with the first experiment and the respective variable content section identifiers that have been received is not found, proceeding to a next variable content section identifier that has been received.

13. The method of claim 10, further comprising:
identifying a second experiment of the one or more experiments associated with the page identifier, the second experiment corresponding to the second experiment schema;
for respective variable content section identifiers that have been received:
searching for variable content associated with the second experiment and the respective variable content section identifiers;
if variable content associated with the second experiment and the respective variable content section identifiers is found:
selecting respective variable content items associated with the second experiment and the respective variable content section identifiers; and
transmitting the respective variable content items for placement on the test web page in variable content sections corresponding to the respective variable content section identifiers.

14. The method of claim 13, further comprising:
measuring the effectiveness of the test web page in achieving the goal, wherein the effectiveness is based on the test web page displaying the particular set of variable content items associated with each of the first experiment and the second experiment and the respective variable content section identifiers that have been received; and identifying the most effective website content based on the effectiveness determined from the first experiment and the effectiveness determined from the second experiment.

15. A multivariate experimentation system configured to perform multiple experiments on a test web page, comprising:
   a user interface device; and
   one or more computers operable to interact with the user interface device and to:
      receive the test web page, the test web page having a page identifier;
      identify a plurality of variable content sections included in the test web page, each variable content section having a corresponding variable content section identifier, a particular combination of variable content section identifiers being identified in an experiment schema associated with a particular experiment of the multiple experiments, a particular set of variable content items associated with the particular combination of variable content section identifiers being associated with an effectiveness in achieving a goal, the goal being selected based on different types of user interactions with the test web page;
      send each corresponding variable content section identifier to the user interface device;
      receive a first set of variable content section identifiers selected on the user interface device to define a first experiment schema associated with a first experiment to be conducted on the test web page, the first experiment including a first experiment identifier that is one identifier of a plurality of experiment identifiers associated with the test web page; and
      receive a second set of variable content section identifiers selected on the user interface device to define a second experiment schema associated with a second experiment to be conducted on the test web page, the second experiment including a second experiment identifier that is one identifier of the plurality of experiment identifiers associated with the test web page.

16. The system of claim 15, wherein:
   the first set of variable content section identifiers has at least one variable content section identifier in common with the second set of variable content section identifiers.

17. The system of claim 15, wherein the one or more computers are further operable to:
   store the first experiment identifier of the first experiment and the second experiment identifier of the second experiment in association with the page identifier of the test web page.

18. The system of claim 15, wherein the one or more computers are further operable to:
   receive the page identifier of the test web page;
   receive each variable content section identifier;
   identify the first experiment of one or more experiments associated with the page identifier, the first experiment being associated with the first set of variable content section identifiers;
   for respective variable content section identifiers that have been received:
      search for variable content associated with the first experiment and the respective variable content section identifiers;
      if variable content associated with the first experiment and the respective variable content section identifiers is found:
         select respective variable content items associated with the first experiment and the respective variable content section identifiers; and
         transmit the respective variable content items to a first user computer for display on the test web page in variable content sections corresponding to the respective variable content section identifiers.

19. The system of claim 18, wherein the one or more computers are further operable to:
   identify the second experiment of the one or more experiments associated with the page identifier, the second experiment being associated with the second set of variable content section identifiers;
   for respective variable content section identifiers that have been received:
      search for variable content associated with the second experiment and the respective variable content section identifiers;
      if variable content associated with the second experiment and the respective variable content section identifiers is found:
         select respective variable content items associated with the second experiment and the variable content section identifiers; and
         transmit the respective variable content items to a second user computer for display on the test web page in variable content sections corresponding to the respective variable content section identifiers.

20. The system of claim 15, wherein the one or more computers are further operable to:
   measure the first effectiveness of the test web page in achieving the goal, wherein the first effectiveness is based on the test web page displaying a first particular subset of variable content items associated with the first experiment and respective variable content section identifiers that have been received;
   measure the second effectiveness of the test web page in achieving goal, wherein the second effectiveness is based on the test web page displaying a second particular subset of variable content items associated with the second experiment and respective variable content section identifiers that have been received; and
   identify the most effective website content based on the first effectiveness and the second effectiveness.

* * * * *

UNITED STATES PATENT AND TRADEMARK OFFICE
CERTIFICATE OF CORRECTION

PATENT NO. : 8,296,643 B1  
APPLICATION NO. : 11/874852  
DATED : October 23, 2012  
INVENTOR(S) : Kenneth Eric Vasilik Page 1 of 1

It is certified that error appears in the above-identified patent and that said Letters Patent is hereby corrected as shown below:

Title Page, Item [56] column 2 (Other Publications), line 2, delete "Han et al., WebSplitter: A Unified XML Framework for Multi-Device Collaborative Web Browsing, ACM 2000, pp. 221-230." and insert the same below "586." on column 2, line 3, as a new entry.

In the Claims:

Page 3, column 12, line 32, claim 1, delete "section" and insert -- sections --.

Page 7, column 15, line 53, claim 18, delete "claim 15," and insert -- claim 17, --.

Page 8, column 16, line 34, claim 19, delete "variable" and insert -- respective variable --.

Signed and Sealed this  
Fourth Day of June, 2013

Teresa Stanek Rea  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,296,643 B1 | Page 1 of 1 |
| APPLICATION NO. | : 11/874852 | |
| DATED | : October 23, 2012 | |
| INVENTOR(S) | : Vasilik | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this
Second Day of September, 2014

Michelle K. Lee
*Deputy Director of the United States Patent and Trademark Office*